R. C. SHARP.
AUTOMATIC EXPANSIBLE PACKING HEAD.
APPLICATION FILED APR. 28, 1921.
1,427,647.
Patented Aug. 29, 1922.
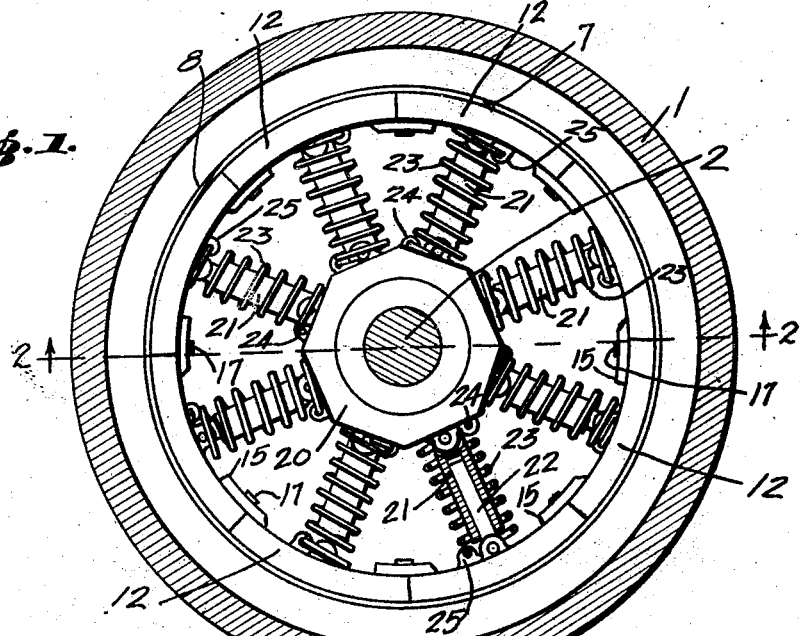
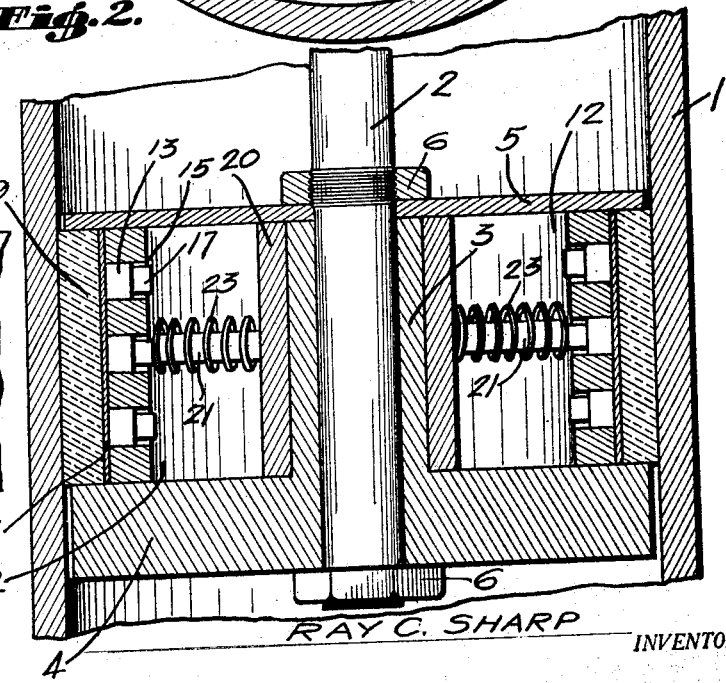
RAY C. SHARP, INVENTOR.
BY *Hazard & Miller*
ATTORNEYS.

UNITED STATES PATENT OFFICE.

RAY C. SHARP, OF ANAHEIM, CALIFORNIA.

AUTOMATIC EXPANSIBLE PACKING HEAD.

1,427,647.

Specification of Letters Patent. Patented Aug. 29, 1922.

Application filed April 28, 1921. Serial No. 465,297.

*To all whom it may concern:*

Be it known that I, RAY C. SHARP, a citizen of the United States, residing at Anaheim, in the county of Orange and State of California, have invented new and useful Improvements in Automatic Expansible Packing Heads, of which the following is a specification.

This invention is an expansible head employed in connection with packing, as a piston head, or the like, and so arranged as to automatically expand in order to take up the wear in the packing while being also provided with means whereby the head may be manually retracted when it is desired to remove the same from the cylinder in which it functions.

The invention will be readily understood from the following description of the accompanying drawings, in which:

Figure 1 is a plan view of an expansible head constructed in accordance with the invention, and showing the end disc of the same removed.

Fig. 2 is an axial section on the line 2—2 of Fig. 1.

Fig. 3 is a detail of the joint.

The expansible head may be employed as a piston head, or the like, functioning within a cylinder 1, and the head is preferably mounted upon a piston rod or the like, extending into said cylinder. The head includes a sleeve 3 upon rod 2 and having an end flange 4 fitting loosely within cylinder 1 and forming one end of the expansible head. The other end of the head is formed by a disc 5 fitting loosely within cylinder 1 and received upon rod 2 against the end of sleeve 3. The parts may be held upon rod 2 by means of usual nuts 6.

The space between the end members 4 and 5 is closed by a peripheral strip 7 preferably formed with overlapping tapering ends, as shown at 8, and in order that said strip may readily expand and contract. A usual packing ring 9 of rubber, or the like, is received over this peripheral strip and is arranged for engagement with the wall of cylinder 1 in order to form a leak proof construction. Means are arranged within the hollow expansible head for automatically expanding strip 7 and the ring 9, in order to maintain a tight contact irrespective of wear of the packing, and said expanding means may be manually retracted when it is desired to remove the expansible head from cylinder 1.

As an instance of this arrangement, arcuate members 12 are received within strip 7, and the meeting ends of said arcuate members form tongue and recess connections including tongues 13 and recesses 14 in the ends of the arcuate members. Bars 15 overlie these tongue and recess connections and are held in place between members 4 and 5 of the expansible head. The tongues of one of the arcuate members, at a connection between adjacent members, are provided with projecting lugs 17 which are received in recesses 18 in bars 15, and as a consequence the arcuate members will be held in position by the bars so as to form a circumferentially extending member received within the peripheral strip 7, while permitting of expansion of said member through circumferential shifting of the arcuate members relative to one another.

A sleeve 20 is rotatably mounted upon sleeve 3, and spring connections are provided between said sleeve and the arcuate members 12 in order to yieldably expand the latter. As an instance of this arrangement tubes 21 are pivoted to sleeve 20, and pins 22 are pivoted to the arcuate sections 12 and are telescopically received in tubes 21. Coil springs 23 are received round tubes 21 with one end of each spring secured to a lug 24 projecting from sleeve 20, and the opposite end of each spring secured to a lug 25 projecting from one of the arcuate members 12. By this arrangement it will be noted that with the parts in normal position, as shown in Fig. 1, and with the telescoping pins and tubes radially alined, springs 23 will tend to expand the sections 12 so as to yieldably maintain packing 9 against the wall of cylinder 1.

When it is desired to release the pressure of packing 9 against cylinder 1 for removing the expansible head from the cylinder, it is only necessary to remove end plate 5 and rotate sleeve 20 by grasping the same with a suitable wrench. The spring connections being thus moved out of radial alinement will no longer form tensioning means urging sections 12 outwardly, and as a consequence the pressure of packing 9 against the wall of cylinder 1 is released.

It will thus be seen that I have provided an extremely simple construction for an expansible head, wherein the head is automatically expanded to force packing upon said head outwardly into intimate contact with the wall of the cylinder, the construction also providing means whereby the automatic expanding means may be caused to become inoperative when it is desired to remove the head and its packing.

Various changes may be made without departing from the spirit of the invention as claimed.

What is claimed is:

1. A packing head comprising a piston rod, a sleeve upon the rod and having an end flange adapted to fit loosely within a cylinder and forming one end of the head, a disc adapted to fit loosely within the cylinder and mounted upon the piston rod against the sleeve, nuts upon the piston rod below the sleeve and above the disc, a peripheral strip fitting between the disc and the end flange and having overlapping tapering ends, a packing ring around the peripheral strip and adapted to fit the cylinder, arcuate members mounted within the peripheral strip and having tongue and recess connections, bars overlapping the tongue and recess connections, lugs projecting from the arcuate members into the bars, a second sleeve rotatably mounted upon the first sleeve, tubes pivoted to the second sleeve, pins pivoted to the arcuate members and mounted telescopically in the tubes, and coil springs mounted around the tubes between the arcuate members and the second sleeve, the tensions of said springs being exerted to press the packing against the wall of the cylinder and so that by removing the disc the second sleeve may be rotated to release the tension of the springs so that the head may be removed from the cylinder.

2. A packing head comprising a piston rod, a sleeve mounted upon one end of the piston rod, a head extending from one end of the sleeve, a disc adapted to be mounted upon the piston rod against the other end of the sleeve, an expansible strip mounted between the disc and the head, a packing ring outside of the strip, arcuate members inside of the strip, a second sleeve rotatably mounted upon the first sleeve, and spring connections between the second sleeve and the arcuate members so that when the second sleeve is rotated to bring the springs into radial positions the packing ring is expanded, and so that when the sleeve is rotated to bring the springs into tangential positions the packing ring is released.

In testimony whereof I have signed my name to this specification.

RAY C. SHARP.